United States Patent
Choi et al.

(10) Patent No.: US 10,297,868 B2
(45) Date of Patent: May 21, 2019

(54) METHOD FOR MANUFACTURING ELECTRODE ASSEMBLY FOR SECONDARY BATTERY

(71) Applicant: LG Chem, Ltd., Seoul (KR)

(72) Inventors: Soon-Hyung Choi, Daejeon (KR); Jung-Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 122 days.

(21) Appl. No.: 15/531,886

(22) PCT Filed: Dec. 3, 2015

(86) PCT No.: PCT/KR2015/013171
§ 371 (c)(1),
(2) Date: May 31, 2017

(87) PCT Pub. No.: WO2016/089144
PCT Pub. Date: Jun. 9, 2016

(65) Prior Publication Data
US 2017/0263982 A1      Sep. 14, 2017

(30) Foreign Application Priority Data

Dec. 3, 2014 (KR) .......................... 10-2014-0172401

(51) Int. Cl.
*H01M 10/04* (2006.01)
*H01M 10/0525* (2010.01)
*H01M 10/0585* (2010.01)

(52) U.S. Cl.
CPC ... *H01M 10/0585* (2013.01); *H01M 10/0436* (2013.01); *H01M 10/0468* (2013.01); *H01M 10/0525* (2013.01)

(58) Field of Classification Search
None
See application file for complete search history.

(56) References Cited

U.S. PATENT DOCUMENTS

2014/0205886 A1     7/2014  Sakaguchi

FOREIGN PATENT DOCUMENTS

| EP | 0928035 A1 | 7/1999 |
| JP | H11273709 A | 10/1999 |

(Continued)

OTHER PUBLICATIONS

Search report from International Application No. PCT/KR2015/013171, dated May 4, 2016.

*Primary Examiner* — Daniel S Gatewood
(74) *Attorney, Agent, or Firm* — Lerner, David, Littenberg, Krumholz & Mentlik, LLP

(57) ABSTRACT

Disclosed is a method for manufacturing a secondary battery. More specifically, the present disclosure relates to a method for manufacturing an electrode assembly by stacking a plurality of bi-cell type and/or monocell type unit cells. A method for manufacturing an electrode assembly according to the present disclosure can easily remove the curvature which occurs in a unit cell in a roll lamination process, and fabricate a flat plate electrode assembly with a simple process. Further, when the electrode assembly is manufactured with the method described above, the curvature between the unit cells constituting the electrode assembly may be offset, and accordingly, a time during which the flat plate shape in the electrode assembly is maintained may be extended significantly.

17 Claims, 9 Drawing Sheets

(56) References Cited

FOREIGN PATENT DOCUMENTS

| | | | |
|---|---|---|---|
| JP | 2000294296 | A | 10/2000 |
| JP | 2007149349 | A | 6/2007 |
| JP | 2008130414 | A | 6/2008 |
| JP | 2013084445 | A * | 5/2013 |
| JP | 2013084445 | A | 5/2013 |
| JP | 2014072008 | A | 4/2014 |
| JP | 2014139885 | A | 7/2014 |
| KR | 20140062568 | A | 5/2014 |

* cited by examiner

METHOD FOR MANUFACTURING ELECTRODE ASSEMBLY FOR SECONDARY BATTERY

CROSS REFERENCE TO RELATED APPLICATIONS

The present application is a national phase entry under 35 U.S.C. § 371 of International Application No. PCT/KR2015/013171, filed Dec. 3, 2015, published in Korean, which claims the benefit of Korean Patent Application No. 10-2014-0172401 filed on Dec. 3, 2014, with the Korean Intellectual Property Office, the disclosures of which are herein incorporated by reference in their entirety.

TECHNICAL FIELD

The present disclosure relates to an electrode assembly for a secondary battery and a manufacturing method thereof. More specifically, the present disclosure relates to a method for manufacturing an electrode assembly by stacking a plurality of bi-cell type and/or monocell type unit cells.

BACKGROUND ART

With the increase of the technological development and demand for a mobile device, demand for a battery as an energy source rapidly increases, and accordingly, many researches of the battery meeting various requests are conducted. Representatively, in view of a battery shape, a prismatic secondary battery and a pouch type secondary battery that can be applied to products such as a mobile phone with a thin thickness shows high demand, and in view of a battery material, a lithium secondary battery such as lithium ion battery and lithium ion polymer battery having advantages such as high energy density, discharging voltage, and output stability shows high demand.

Further, the secondary battery may be classified according to a structure of a positive electrode/separator/negative electrode structure of an electrode assembly. There may be, for example, a jelly-roll type electrode assembly having a structure in which long sheets of positive electrodes and negative electrodes are wound while a separator is interposed therebetween, a stack type electrode assembly having a structure in which a plurality of the positive electrodes and the negative electrodes, cut by a certain size unit, are sequentially stacked while the separator is interposed therebetween, and a stack/folding type electrode assembly having a structure in which bi-cells or monocells stacked with certain units of the positive electrodes and the negative electrodes are wound with a separation film and so on while a separator is interposed therebetween.

Recently, a pouch type battery having a structure in which the stack type electrode assembly is placed within an aluminum laminate sheet of a pouch type battery case gathers much interest with reasons of low manufacturing cost, small weight, and easy shape modification, and further, utilization thereof gradually increases.

FIG. 1 briefly illustrates a process of manufacturing the monocell to prepare the electrode assembly of a related stack type battery. A minimum unit monocell may generally include separator/first electrode/separator/second electrode. As illustrated in FIG. 1, a unit monocell may be manufactured by sequentially stacking separator 11/first electrode 12/separator 11/second electrode 13, interlayer-bonding each layer by heating and pressing according to a roll lamination process, and cutting the tightly contacted layers properly with cutters C1, C2, C3. A related bi-cell manufacturing process may be also manufactured in a similar format to the above monocell manufacturing process even though there is difference in a stacking order of the electrodes and the separators. However, the monocell and/or the bi-cell manufactured through the roll lamination process has a disadvantage in which it may be bent with the heat and the pressure applied while passing through a roller and may have a curved shape instead of a flat plate shape. Further, as illustrated in FIG. 1, the separators and the electrodes may be stored in a wound state until it is unwound and provided to a roll lamination for stacking. Such curvature phenomenon may more prominently appear when the modification applied during wound state is not sufficiently removed by the roll lamination. Because the stack type battery may be used in manufacturing a prismatic battery having a flat plate shape, an additional process to modify such a curved shape monocell and/or bi-cell into a flat plate shape may be needed.

FIG. 2 briefly illustrates a related stack type battery manufacturing process. First, the electrode assembly 100 may be manufactured by piling and stacking the bent unit cells 10 (monocell and/or bi-cell) so that directions of curvature are same as each other, followed by taping 20 and fixing. The electrode assembly may maintain a curve shape. Thereafter, the electrode assembly may be modified into a flat plate shape by simultaneously pressing upper/lower portions of the electrode assembly with the curved flat plate jig J. However, because directions of curvature are same in the stacked unit cells, the modifying stresses remained on a curved portion may be strengthened by each other between the unit cells, and accordingly, there is a problem that removing the curvature from the electrode assembly may not be easy.

DISCLOSURE

Technical Problem

The present disclosure is designed to solve the problems of the related art, and therefore the present disclosure is directed to providing an efficient method for removing curvature of an electrode assembly manufactured by stacking unit cells bent through a roll lamination process. These and other objects and advantages of the present disclosure may be understood from the following detailed description and will become more fully apparent from the exemplary embodiments of the present disclosure. Also, it will be easily understood that the objects and advantages of the present disclosure may be realized by the means or methods described in the appended claims and combinations thereof.

Technical Solution

In one aspect of the present disclosure, there is provided a method for manufacturing a flat plate electrode assembly for an electro-chemical device.

In a first aspect of the present disclosure, a method for manufacturing a flat plate electrode assembly includes: piling first and second unit cell stacks, which are curved in a C shape and have a certain curvature radius, so that concave surfaces thereof face each other (S1); and removing curvature from the unit cell stack by pressing the piled first and second unit cell stacks (S2).

In a second aspect of the present disclosure, and in the first aspect described above, the curvature radius R1 of the first unit cell stack at S1 is −10% to +10% of the curvature radius R2 of the second unit cell stack.

In a third aspect of the present disclosure, and in any of the first or second aspect described above, a curvature central axis of each unit cell stack at S1 is positioned on a vertical plane to a facing plane of the unit cell stack.

In a fourth aspect of the present disclosure, and in any of the first to third aspects described above, the first and second unit cell stacks are respectively monocell and/or bi-cell.

In a fifth aspect of the present disclosure, and in any of the first to fourth aspects described above, the flat plate electrode assembly is bi-cell type and/or monocell type.

In a sixth aspect of the present disclosure, and in any of the first to fifth aspects described above, the first and second unit cell stacks are respectively one unit monocell and unit bi-cell, or formed by stacking two or more unit monocells or unit bi-cells.

Further, in a seventh aspect of the present disclosure, and in any of the first to sixth aspects described above, the flat plate electrode assembly is monocell type or bi-cell type in which a plurality of electrodes and a plurality of separators are alternated and stacked, and the separator is interposed between the two opposite electrodes.

In an eighth aspect of the present disclosure, and in the seventh aspect described above, the flat plate electrode assembly is bi-cell type in which a polarity of the electrode disposed on an uppermost end portion and a polarity of the electrode disposed on a lowermost end portion are same as each other.

In a ninth aspect of the present disclosure, and in the seventh aspect described above, the flat plate electrode assembly is monocell type in which a polarity of the electrode disposed on the uppermost end portion and a polarity of the electrode disposed on the lowermost end portion are opposite each other.

Further, in a tenth aspect of the present disclosure, and in any of the first to ninth aspects described above, a third unit cell stack having a planar shape with an infinite curvature radius is inserted between the first unit cell stack and the second unit cell stack at S1.

In an eleventh aspect, and in the tenth aspect described above, the third unit cell stack is monocell type or bi-cell type.

Advantageous Effects

The present disclosure gives the following effects.

A method for manufacturing an electrode assembly according to the present disclosure can easily remove the curvature which occurs in a unit cell in a roll lamination process, and fabricate a flat plate electrode assembly with a simple process. Further, when the electrode assembly is manufactured with the method described above, the curvature between the unit cells constituting the electrode assembly may be offset, and accordingly, a time during which the flat plate shape in the electrode assembly is maintained may be extended significantly.

DESCRIPTION OF DRAWINGS

Other objects and aspects of the present disclosure will become apparent from the following descriptions of the embodiments with reference to the accompanying drawings. The accompanying drawings illustrate preferred embodiments of the present disclosure and together with the foregoing disclosure, serve to provide further understanding of the technical spirit of the present disclosure, and thus, the present disclosure is not construed as being limited to the drawings. Meanwhile, the shapes, sizes, scales or ratios of the elements of the drawings annexed to the present disclosure may be exaggerated to emphasize more clarity of the description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The present disclosure relates to a method for manufacturing an electrode assembly by stacking a monocell and/or bi-cell form of unit cells, and more specifically, to a method for manufacturing a flat plate electrode assembly by stacking a curved shape unit cells with a roll lamination process.

According to the present disclosure, the electrode assembly is a stack of a positive electrode and a negative electrode with a separator interposed therebetween, which may be used in the electro-chemical device such as lithium ion secondary battery.

Figure 1:
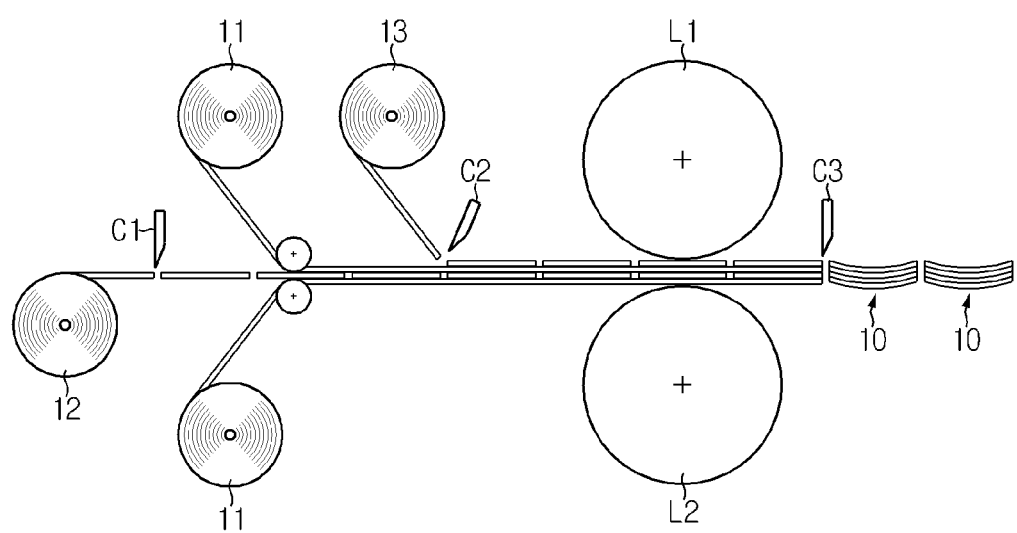
FIG. 1 illustrates a roll lamination process of manufacturing a related unit cell.
Figure 2:
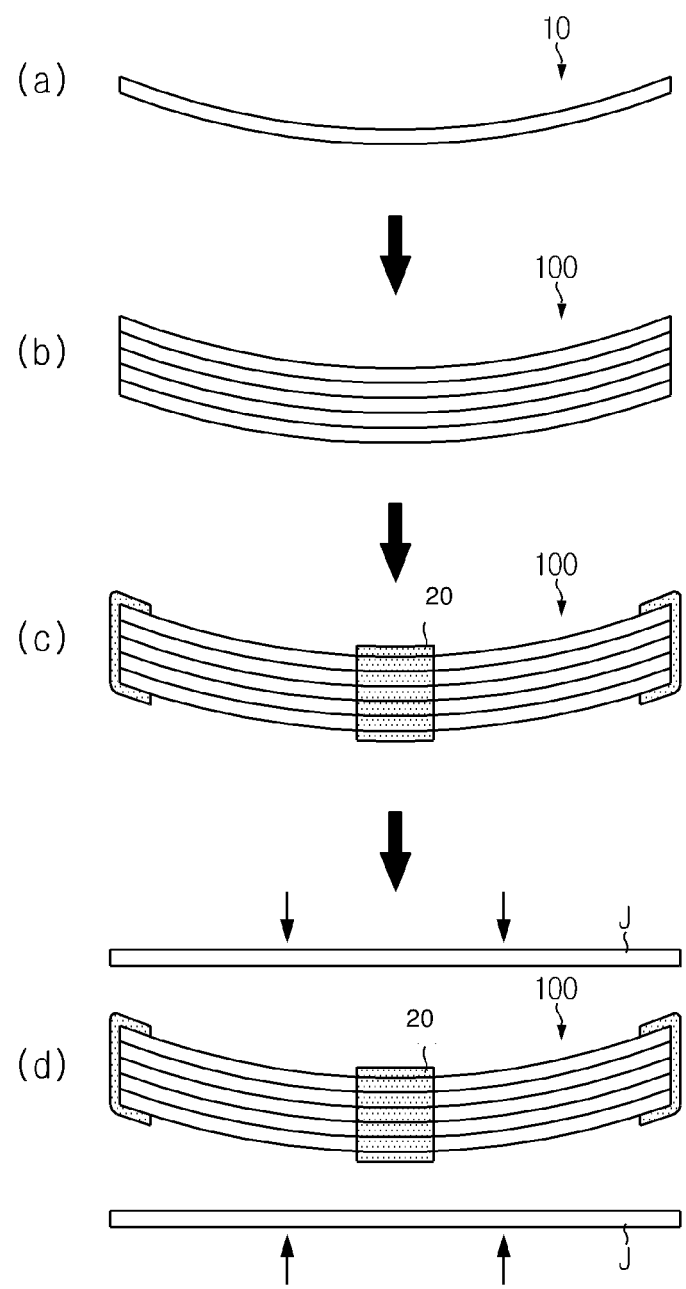
FIG. 2 illustrates a process of manufacturing an electrode assembly by stacking related unit cells in curved shape.
Figure 3:
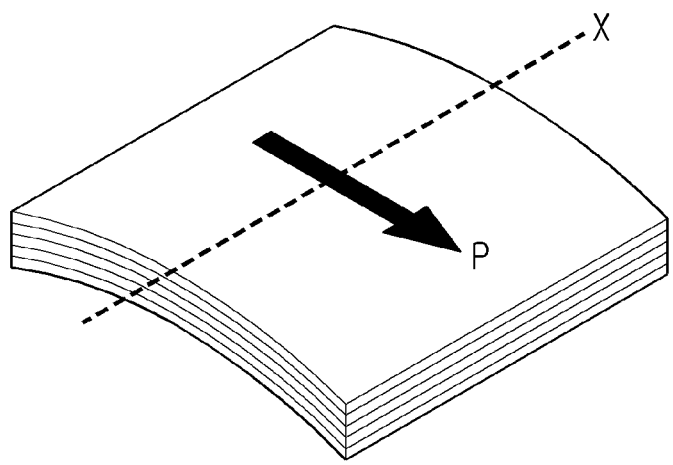
FIG. 3 illustrates a unit cell with an axis of curvature marked thereon.

Referring to FIGS. 1 and 2, the unit cells included in the electrode assembly are generally manufactured with the roll lamination process as described above, and manufactured to have a curved shape by the heat and the pressure applied hereto. The curved unit cells may be curved based on a certain axis of curvature, and the axis of curvature X is generally in a vertical direction to an advancing direction of a roller. FIG. 3 illustrates that the axis of curvature X in each unit cell is formed vertically to the roller advancing direction P.

Figure 4:
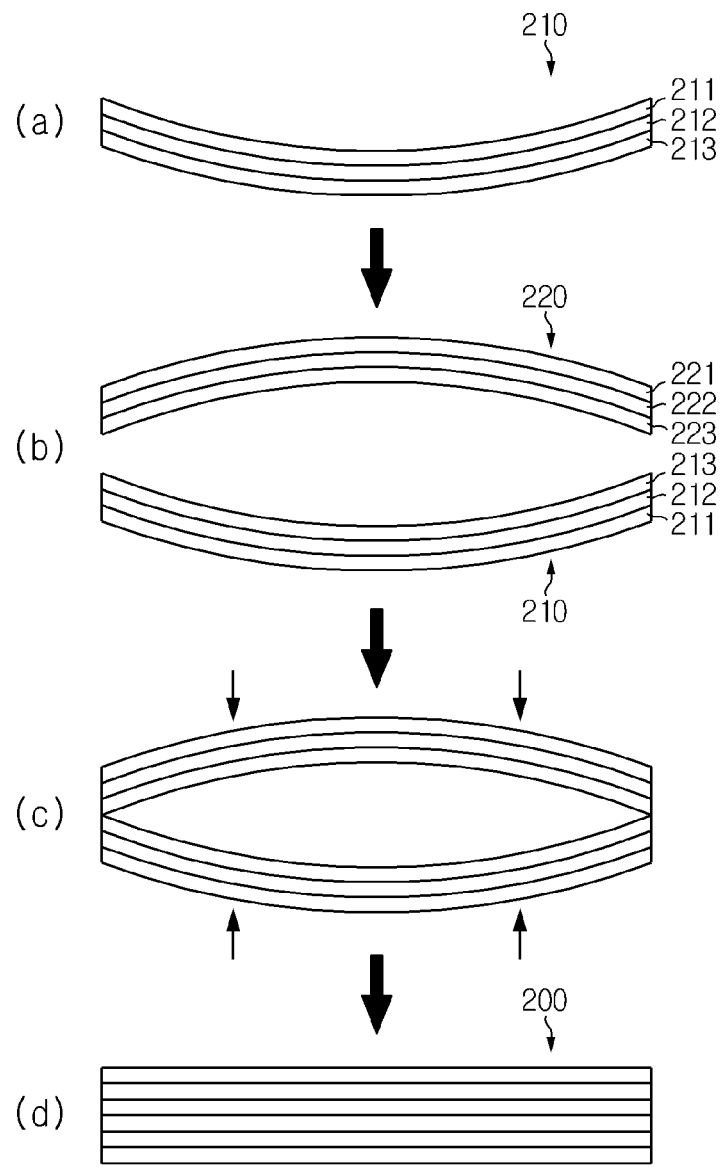
FIG. 4 briefly illustrates a method for manufacturing an electrode assembly according to an embodiment of the present disclosure.

FIG. 4 briefly illustrates a method for manufacturing the electrode assembly according to an embodiment. Hereinafter, preferred embodiments of the present disclosure will be described in detail with reference to the accompanying drawings.

Referring to FIG. 4, a first unit cell stack 210 curved in a C shape and having a certain curvature radius may be prepared at 4A. The unit cell stack may be one monocell or bi-cell type unit cell, or a stack of two or more monocell or bi-cell type unit cells formed in a uniform direction of curvature.

Next, a second unit cell stack 220 curved in a C shape and having a certain curvature radius may be prepared at 4B. Likewise in the first unit cell stack, the second unit cell stack may be one monocell or bi-cell type unit cell, or a stack of two or more monocell and/or bi-cell type unit cells formed in a uniform direction of curvature.

The first unit cell stack and the second unit cell stack may be manufactured by artificially curving a unit cell or a unit cell stack on a plane. However, according to a detailed embodiment of the present disclosure, the curvature of the unit cell and the unit cell stack may be naturally formed due to heat and/or pressure applied during the roll lamination process.

Next, the first and second unit cell stacks may be piled so that concave surfaces thereof face each other at 4B.

Figure 5:
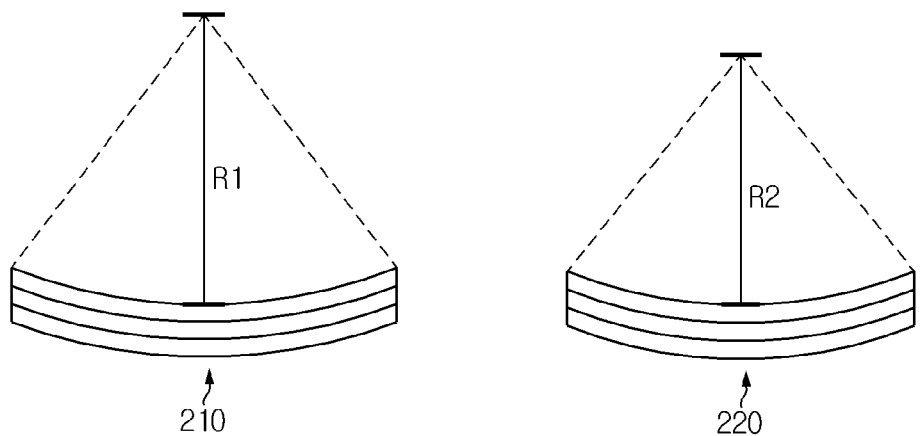
FIG. 5 briefly illustrates difference in curvature radii of a first unit cell stack and a second unit cell stack.

According to a detailed embodiment of the present disclosure, the first and second unit cell stacks may respectively have a certain curvature radius. Preferably, a curvature radius R1 of the first unit cell stack may be about −10% to +10% of a curvature radius R2 of the second unit cell stack, and more preferably, the first unit cell stack and the second unit cell stack may have a uniform curvature radius (see FIG. 5).

Further, according to a preferred embodiment of the present disclosure, the first unit cell stack and the second unit cell stack may have a same uniform curvature radius, and a horizontal length and a vertical length of the unit cell stack are same as each other. When satisfying the these conditions, as illustrated in FIG. 4C, curvature may be most efficiently offset when the curved edge portions of the both unit cell stacks contact each other to be pressed.

Figure 6:
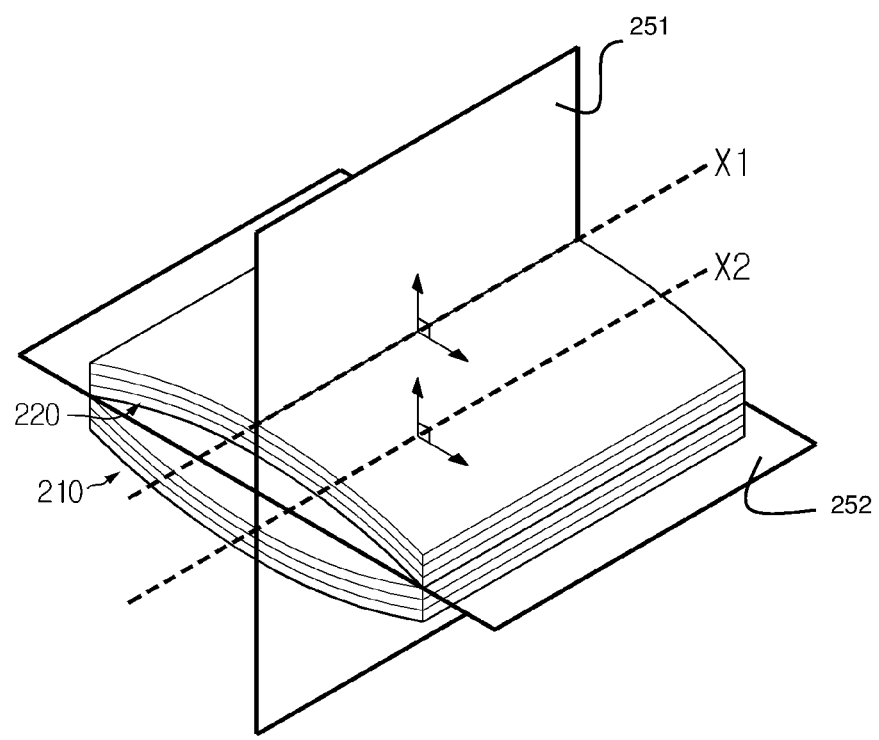
FIG. 6 illustrates that axes of curvature of a first unit cell stack and a second unit cell stack are positioned on a vertical plane to a facing plane of the unit cell stack.

According to a detailed embodiment of the present disclosure shown in FIG. 6, when the first unit cell stack 210 and the second unit cell stack 220 are piled and stacked so that the concave surfaces thereof face each other, an axis of curvature X1 of the first unit cell stack 210 and an axis of curvature X2 of the second unit cell stack 220 may be preferably positioned on a vertical plane 251 to a facing plane 252 located between the first unit cell stack 210 and the second unit cell stack 220. In the present disclosure, the term "facing plane" means a virtual plane present between the first unit cell stack 210 and the second unit cell stack 220 which face each other, and for example, is a plane based on which the first unit cell stack 210 and the second unit cell stack 220 are symmetric to each other.

FIG. 6 illustrates that each of the piled axes of curvature X1 X2 is positioned on the vertical plane 251 to the facing plane 252. When the axes of curvature X1, X2 are intersecting by having a certain angle or are not positioned on the same vertical plane 251 to the facing plane 252, curvature offset may not be efficiently generated with the pressing performed at a process described below.

Next, a flat plate electrode assembly may be obtained by externally pressing the piled first and second unit cell stacks, bonding the unit cell stacks, and removing the curvature at S2. According to a detailed embodiment of the present disclosure, the pressing may be preferably performed toward a center surface of the electrode assembly, in a vertical direction to the facing plane 252 of the first and second unit cell stacks 210, 220. For example, the pressing may be performed by using a pair of jigs including an upper pressing member and a lower support member, and preferably, the upper pressing member and the lower support member may be flat plate shapes. That is, the unit cell stacks may be bonded by arranging the unit cell stacks piled with the concave portions thereof facing each other on an upper surface of the lower support member, and pressing the upper pressing member in a downward direction.

In the electrode assembly manufactured according to the method described above, a plurality of the electrodes and a plurality of the separators are alternately stacked with each other, and the opposite electrodes having different opposite polarities from each other are respectively positioned on both side surfaces of the separator. That is, the separator within the electrode assembly may be interposed and stacked between the two opposite electrodes, and the electrode assembly may be monocell type or bi-cell type.

In the monocell type electrode assembly described above, the electrode disposed on an uppermost end portion and the electrode disposed on a lowermost end portion among the electrodes may have opposite polarities from each other. Further, in the bi-cell type electrode assembly described above, the electrode disposed on the uppermost end portion and the electrode disposed on the lowermost end portion among the electrodes may have a same polarity as each other. According to a detailed embodiment of the present disclosure, in the above bi-cell type or monocell type electrode assembly described above, according to the need, the separator may be disposed or may not be disposed on an outer side of the uppermost electrode and/or the lowermost electrode. Further, terms 'uppermost end portion' and 'lowermost end portion' as used herein are intended to indicate relative directions for convenience of description, and they do not determine absolute physical positions.

Figure 7:
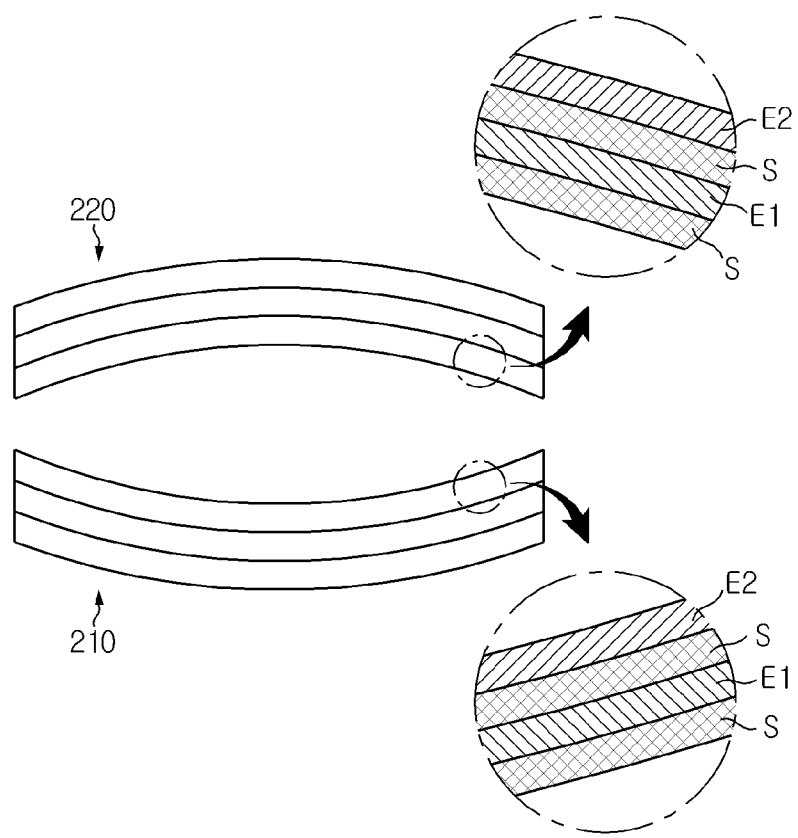
FIG. 7 illustrates an embodiment of manufacturing a monocell type electrode assembly by stacking a first unit cell stack and a second unit cell stack, among methods according to the present disclosure.

FIG. 7 illustrates a method for manufacturing the monocell type electrode assembly according to an embodiment. According to a detailed embodiment of the present disclosure, the first unit cell stack may be a monocell type unit cell stack in which the monocell type unit cells, having separator/first electrode/separator/second electrode sequentially stacked from the lower side of the drawing, are stacked. Further, the second unit cell stack may be a monocell type unit cell stack in which separator/first electrode/separator/second electrode are stacked from the lower side of the drawing. In this case, because the second electrode may be exposed externally from one end of the electrode assembly, a process of forming the separator on the exposed upper surface of the second electrode may be additionally performed for the purpose of the exposure prevention.

According to a detailed embodiment of the present disclosure, the curved first unit cell stack and second unit cell stack may be piled by having a flat plate third unit cell stack interposed therebetween. According to a detailed embodiment of the present disclosure, the third unit cell stack may have a planar shape with an infinite curvature radius. Further, the third unit cell stack may be monocell type or bi-cell type.

According to a detailed embodiment of the present disclosure, as the third unit cell stack, the electrode assembly manufactured according to the method for manufacturing the electrode assembly of the present disclosure may be used.

Figure 8:
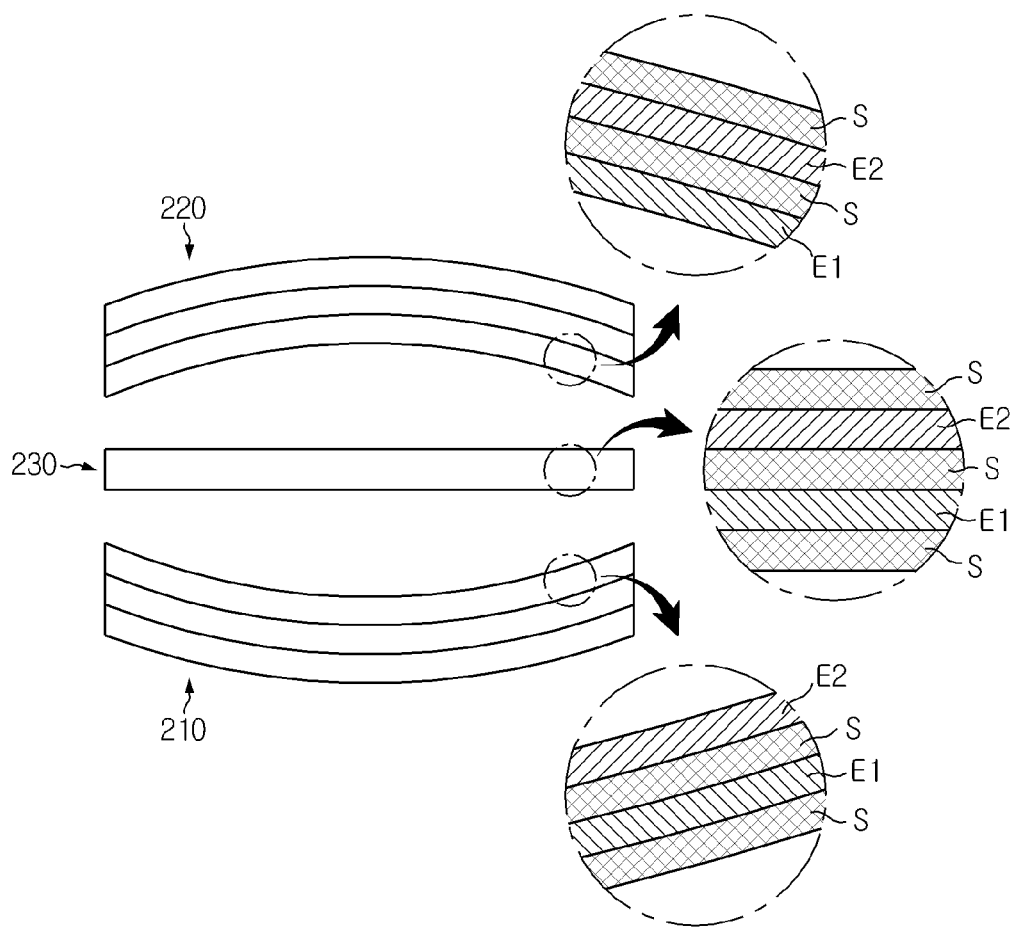
FIGS. 8 and 9 illustrate an embodiment of manufacturing an electrode assembly by interposing a flat plate third unit cell stack between a first unit cell stack and a second unit cell stack.
Figure 9:
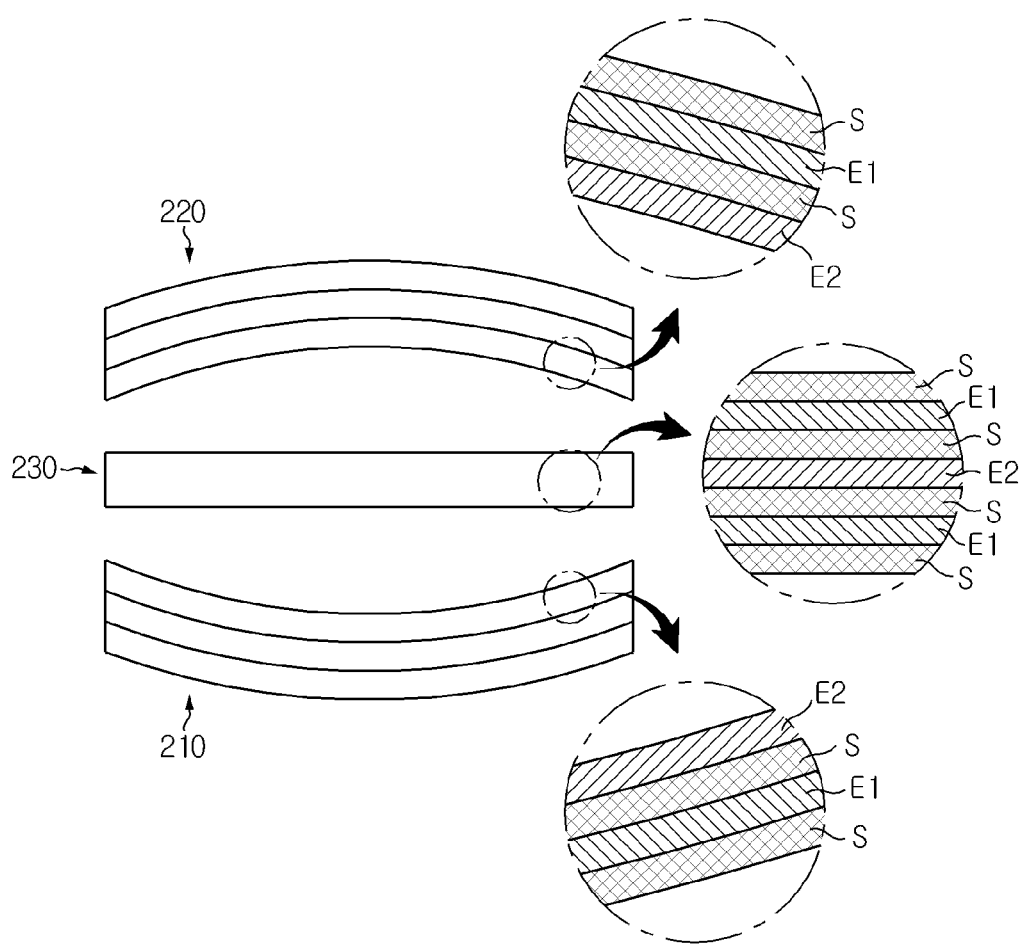

FIG. 8 illustrates that the first unit cell stack and the second unit cell stack are stacked by having the third unit cell stack, which is monocell type and provided with the separators on both surfaces, interposed therebetween. Further, FIG. 9 illustrates that the first unit cell stack and the second unit cell stack are stacked by having the third unit cell stack, which is bi-cell type and formed with the separators on the both surfaces, interposed therebetween. When the electrode assembly is manufactured by having a flat plate third unit cell stack, curvature of the first and second unit cell stacks may be removed more efficiently.

Figure 10:
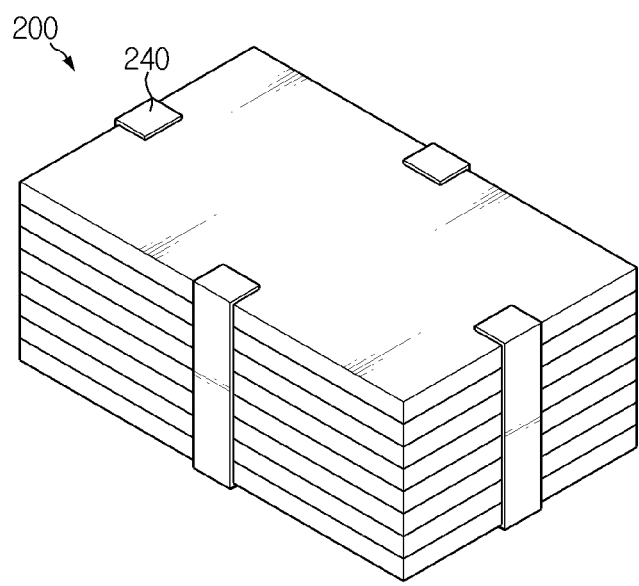
FIG. 10 illustrates an embodiment of fixing the manufactured electrode assembly by taping the same.

Finally, the electrode assembly formed by removing curvature may be taped for fixation. FIG. 10 briefly illustrates an embodiment of taping and fixing the electrode assembly according to an embodiment.

According to the present disclosure, materials of the separator and the electrode may not be limited as long as they are used generally in the electro-chemical device such as, specifically, the secondary battery or the lithium ion secondary battery, which will not be specifically described herein.

The present disclosure has been described in detail. However it should be understood that the detailed description and specific examples, while indicating preferred embodiments of the disclosure, are given by way of illustration only, since various changes and modifications within the scope of the disclosure will become apparent to those skilled in the art from the detailed description.

DESCRIPTION OF REFERENCE NUMERALS 100, 200: electrode assembly
10, 210, 220, 230: unit cell stack
20, 240: tape 11, S: separator
12, E1: first electrode 13, E2: second electrode
211, 221, 231: unit cell
C1, C2, C3: cutter

What is claimed is:

1. A method for manufacturing a flat plate electrode assembly, comprising:
    piling first and second unit cell stacks curved in a C shape and having a certain curvature radius so that concave surfaces thereof face each other; and
    removing a curvature from the unit cell stack by pressing the piled first and second unit cell stacks.

2. The method of claim 1, wherein, at the step of piling, a curvature radius of the concave surface of the first unit cell stack is −10% to +10% of a curvature radius of the concave surface of the second unit cell stack.

3. The method of claim 1, wherein, at the step of piling, a curvature central axis of each of the unit cell stacks is positioned on a vertical plane to a facing plane of the unit cell stacks.

4. The method of claim 1, wherein the first and second unit cell stacks are respectively monocell and/or bi-cell.

5. The method of claim 1, wherein the flat plate electrode assembly is bi-cell type and/or monocell type.

6. The method of claim 1, wherein the first and second unit cell stacks are respectively one unit monocell or one unit bi-cell, or are respectively formed by stacking two or more unit monocells or unit bi-cells.

7. The method of claim 1, wherein the flat plate electrode assembly is monocell type or bi-cell type in which a plurality of electrodes and a plurality of separators are alternated and stacked, and the separator is interposed between the two opposite electrodes.

8. The method of claim 7, wherein the flat plate electrode assembly is bi-cell type in which a polarity of the electrode disposed on an uppermost end portion and a polarity of the electrode disposed on a lowermost end portion are same as each other.

9. The method of claim 7, wherein the flat plate electrode assembly is monocell type in which the electrode disposed on an uppermost end portion and the electrode disposed on a lowermost end portion are opposite each other.

10. The method of claim 1, wherein, at the step of piling, a third unit cell stack having a flat planar shape is inserted between the first unit cell stack and the second unit cell stack.

11. The method of claim 10, wherein the third unit cell stack is monocell type or bi-cell type.

12. The method of claim 1, wherein the pressing is performed toward a center surface of the electrode assembly, in a vertical direction to a facing plane of the first and second unit cell stacks.

13. The method of claim 1, wherein the pressing is performed by using a pair of jigs including an upper pressing member and a lower support member, and the upper pressing member and the lower support member have flat plate shapes.

14. The method of claim 1, wherein the first unit cell stack and the second unit cell stack have the same curvature radius, the same horizontal length, and the same vertical length.

15. The method of claim 1, wherein the curvature of each of the unit cell stacks is naturally formed due to a roll lamination process.

16. The method of claim 1, after the step of removing, the electrode assembly formed by removing the curvature is taped for fixation.

17. A lithium ion secondary battery, comprising the electrode assembly of claim 1.

* * * * *